United States Patent [19]
Kent et al.

[11] Patent Number: 6,014,372
[45] Date of Patent: Jan. 11, 2000

[54] ANTENNA BEAM CONGRUENCY SYSTEM FOR SPACECRAFT CELLULAR COMMUNICATIONS SYSTEM

[75] Inventors: Edward Jay Kent, Cherry Hill; Charles Edward Profera, Jr., Blackwood; Thaddeus Arthur Hawkes, Haddonfield, all of N.J.

[73] Assignee: Lockheed Martin Corp., Sunnyvale, Calif.

[21] Appl. No.: 08/986,611

[22] Filed: Dec. 8, 1997

[51] Int. Cl.⁷ .................................................... H04B 7/185
[52] U.S. Cl. ......................... 370/316; 455/427; 455/13.1
[58] Field of Search .................................. 370/310, 315, 370/316, 319, 320, 321, 322, 323, 324, 325, 326, 328, 331, 336, 337, 345, 347, 348; 455/11.1, 12.1, 13.1, 422, 427, 428

[56] References Cited

U.S. PATENT DOCUMENTS

| | | |
|---|---|---|
| 4,641,304 | 2/1987 | Raychaudhuri . |
| 4,688,213 | 8/1987 | Raychaudhuri . |
| 5,752,187 | 5/1998 | Frank et al. ............................. 455/428 |
| 5,765,098 | 6/1998 | Bella ...................................... 455/13.3 |
| 5,815,527 | 9/1998 | Erving et al. ........................... 375/206 |
| 5,838,669 | 11/1998 | Gerakoulis ............................. 370/320 |

*Primary Examiner*—Ajit Patel
*Assistant Examiner*—Bob A Phunkulh
*Attorney, Agent, or Firm*—W.H. Meise; R.P. Kennedy

[57] ABSTRACT

A spacecraft-based cellular communications system includes a spacecraft with transmit and receive antennas, each of which produces a plurality of spot beams which, together, provide coverage of the region served. In order to control the pointing of the spacecraft antennas, four mutually adjacent spot beams are centered over a particular "beacon" location, so that the beacon location lies between a pair of North and South spot beams, and between a pair of East and West spot beams. The transmit antenna is controlled by transmitting a beacon signal in time sequence over each of the four spot beams surrounding the beacon location, and decoding or desequencing the time-sequential signal received at the beacon location. The decoded signal is processed to provide a signal indicating the pointing error of the transmit antenna, and the error signal is used to control a gimbal which controls the pointing of the transmit antenna.

The receive antenna is independently controlled by a generally similar system, in which the beacon signal is transmitted from the beacon location to the receive antenna, and the beacon signal is selectively received from the four spot beams in a time-sequential manner. The received beacon signal is processed in much the same manner as in the transmit antenna controller, and controls a gimbal associated with the receive antenna, to cause the receive antenna to point at the beacon location. Since both transmit and receive antennas point at the beacon location, their beams can be congruent.

15 Claims, 9 Drawing Sheets

ERROR VOLTAGE VS. θ

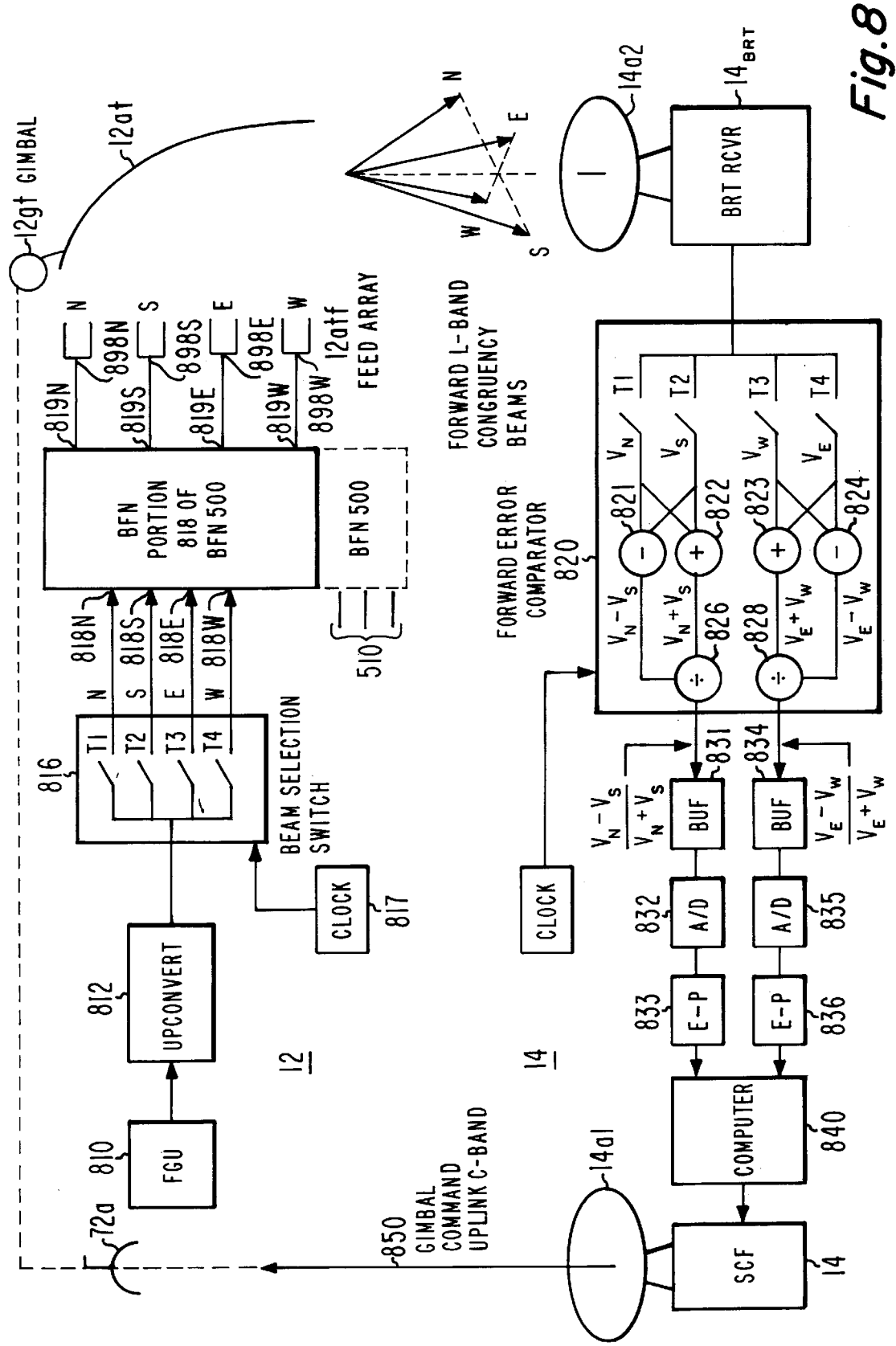

ANTENNA BEAM CONGRUENCY SYSTEM FOR SPACECRAFT CELLULAR COMMUNICATIONS SYSTEM

FIELD OF THE INVENTION

This invention relates to spacecraft cellular communication systems, and more particularly to such systems in which the pointing of a spacecraft antenna may misdirect the beams.

BACKGROUND OF THE INVENTION

This invention relates to cellular communications systems, and more particularly to such systems which provide coverage between terrestrial terminals in a region by way of a spacecraft, where some of the terrestrial terminals may be mobile terminals, and some may be gateways which link the cellular system with a terrestrial network such as a public switched telephone network (PSTN).

A salient feature of a spacecraft communication satellite is that all of the electromagnetic transmissions to the user terminals originate from one, or possibly a few, spacecraft. Consequently, the spacecraft communication antenna must form a plurality of beams, each of which is directed toward a different portion of the underlying target region, so as to divide the target area into cells. The cells defined by the beams will generally overlap, so that a user communication terminal may be located in one of the beams, or in the overlap region between two beams, in which case communication between the user communication terminal and the spacecraft is accomplished over one of the beams, generally that one of the beams which provides the greatest gain or signal power to the user terminal. Operation of spacecraft communication systems may be accomplished in many ways, among which is Time-Division Multiple Access, (TDMA), among which are those systems described, for example, in conjunction with U.S. Pat. Nos. 4,641,304, issued Feb. 3, 1987, and 4,688,213, issued Aug. 18, 1987, both in the name of Raychaudhuri. Spacecraft time-division multiple access (TDMA) communication systems are controlled by a controller which synchronizes the transmissions to account for propagation delay between the terrestrial terminals and the spacecraft, as is well known to those skilled in the art of time division multiple access systems. The TDMA control information, whether generated on the ground or at the spacecraft, is ultimately transmitted from the spacecraft to each of the user terminals. Consequently, some types of control signals must be transmitted continuously over each of the beams in order to reach all of the potential users of the system. More specifically, since a terrestrial terminal may begin operation at any random moment, the control signals must be present at all times in order to allow the terrestrial terminal to begin its transmissions or reception (come into time and control synchronism with the communication system) with the least delay.

When the spacecraft is providing cellular service over a large land mass, many cellular beams may be required. In one embodiment of the invention, the number of separate spot beams is one hundred and forty. As mentioned above, each beam carries control signals. These signals include frequency and time information, broadcast messages, paging messages, and the like. Some of these control signals, such as synchronization signals, are a prerequisite for any other reception, and so may be considered to be most important. When the user communication terminal is synchronized, it is capable of receiving other signals, such as paging signals.

Communication spacecraft are ordinarily powered by electricity derived from solar panels. Because the spacecraft may occasionally go into eclipse, the spacecraft commonly includes rechargeable batteries and control arrangements for recharging the batteries when the power available from the solar panels exceeds the power consumed by the spacecraft payload. When a large number of cellular beams are produced by the antenna, a correspondingly large number of control signals must be transmitted from the spacecraft. When one hundred and forty beams are transmitted, one hundred and forty control signals must be transmitted. When the power available from the solar panels is divided between the information and data transmission channels of the spacecraft, the power available to the synchronization and paging signals may be at a level such that a user communication terminal in an open-air location may respond, but a similar terminal located in a building may not respond, due to attenuation of electromagnetic signals by the building.

FIG. 1 is a simplified block diagram of a spacecraft or satellite cellular communications system 10. In system 10, a spacecraft 12 includes a transmitter (TX) arrangement 12$t$, a receiver (RX) arrangement 12$r$, and a frequency-dependent channelizer 12$c$, which routes bands of frequencies from the receiver 12$r$ to the transmitter 12$t$. Spacecraft 12 also includes an array of frequency converters 12$cv$, which convert each uplink frequency to an appropriate downlink frequency. Spacecraft 12 includes a power source which includes a solar panel (SP) illustrated as 12$s$, and a power converter (PC) or conditioner 12$p$ for converting the solar array power into power suitable for powering the transmitter, receiver, and converters, and other devices on the spacecraft, such as, for example, attitude control systems. A transmitting antenna 12$at$ mounted to the spacecraft body by a two-axis gimbal 12$gt$ generates a plurality 20 of spot beams, one or more spot beams for each frequency band. Some of the spot beams 20$a$, 20$b$, and 20$c$ of set 20 are illustrated by their outlines. Each antenna beam 20$x$ (where x represents any subscript) defines a footprint on the surface 1 of the Earth below. The footprint associated with spot beam 20$a$ is at the nadir 3 directly under the spacecraft, and is designated 20$af$. The footprint associated with spot beam 20$c$ is designated 20$cf$, and is directed toward the horizon 5, while the footprint 20$bf$ associated with spot beam 20$b$ is on a location on surface 1 which lies between nadir 3 and horizon 5. It will be understood that those antenna beams which are illustrated in "lightning bolt" form also produce footprints. As is known to those skilled in the art, the footprints of antenna beams from a spacecraft may overlap (overlap not illustrated in FIG. 1), to provide continuous coverage of the terrestrial region served by the antennas. Spacecraft body 12$b$ also carries, by way of a two-axis gimbal 12$gr$, a receiving antenna 12$ar$, which produces spot beams which are intended to be identical to those of transmitting antenna 12$at$.

Spacecraft 12 also includes a further transmit-receive antenna 72$a$, which produces a single, or possibly two or three, broad transmit beam(s) and corresponding receive beam(s), such as those designated as 20$d$ and 20$e$, which are illustrated by "lightning bolt" symbols in order to simplify the drawing.

For completeness, it should be noted that each separate antenna beam forms an infinite number of more-or-less concentric "footprints" centered about the maximum-beam-intensity point on the ground, with each being a fraction of a decibel (dB) greater than the next inner footprint. When "a" footprint is discussed, a selected energy distribution across the "footprint" is assumed. Thus, a common assumption is that the beam intensity will not vary more than 3 dB across the footprint, which defines the extent of the footprint by the 3 dB contour of the antenna beam. Similarly, overlap of the beams is taken to mean overlap at the designated beam intensity. It should further be noted that a receiving antenna also preferentially receives signals within a receiving "beam," and for a given antenna, the receiving "beam" is "dimensionally" identical to the transmitting beam, in that it has the same beamwidth and gain.

As illustrated in FIG. 1, a group 16 of mobile terrestrial user terminals or stations includes three user terminals, denominated 16a, 16b, and 16c, each of which is illustrated as having an upstanding whip antenna 17a, 17b, and 17c, respectively. User terminal 16a lies on or within the footprint 20af, user terminal 16b lies within footprint 20bf, and user terminal 16c lies within footprint 20cf. User terminals 16a, 16b, and 16c provide communications service to users, as described below. Those skilled in the art will recognize that the illustration of a single user terminal in each footprint is only for ease of understanding, and that many such user terminals may be found in each footprint. More particularly, each illustrated user terminal 16a represents one of a plurality of user terminals which may be found within footprint 20af, and likewise illustrated user terminals 16b and 16c each represent one of a plurality of user terminals which may be found in footprints 20bf and 20cf, respectively.

FIG. 1 also illustrates a terrestrial gateway terminal (a fixed site, tower, or station) 14, which lies in a footprint (not designated) of the (or an) antenna beam 20e. While not illustrated, it should be understood that the footprint associated with beam 20e may also contain user terminals such as $16_x$. Gateway terminal 14 communicates with antenna 72a of spacecraft 12 by way of C-band electromagnetic signals transmitted from an antenna 14a1, and receives C-band signals from the spacecraft by way of the same antenna. Gateway terminal 14 is coupled by a data path 9 with a land-line network or public switched telephone system (PSTN) illustrated as a block 8, and provides communication between spacecraft cellular communications system 10 and the PSTN 8. While a single gateway 14 is illustrated, the system 10 may contain many gateways at spaced-apart locations, to allow the spacecraft communication system to access different PSTNs. The signals traversing antenna beam 20e represent information signals from the user terminals 16 to the gateway terminal 14, and information signals from the gateway to various ones of the user terminals. The information signals are designated generally as COMM.

A network control center (NCC) 18 is illustrated in FIG. 1 as a terrestrial terminal lying in a footprint (not designated) of antenna beam 20d, originating from antenna 72a. The footprint may also contain user terminals (not illustrated). Network control center 18 includes an antenna 18a for communication with the spacecraft, and for communication by way of the spacecraft to the user terminals 16 and the gateway(s) 14. Network control center 18 also includes a GPS receiving antenna 18g for receiving global positioning time signals, to provide position information and an accurate time clock. Network control center 18 performs the synchronization and TDMA slot control which the spacecraft cellular communications network requires. The functions of network control center 18 may be distributed throughout the communication system 10, but unlike the arrangement of the land-based GPS cellular communication system, in which control of the slot timing is independently set at each cell center or tower, there is only one network control center associated with the spacecraft communication system 10, for the required control of the time-division multiple access slots cannot be applied simply to one cell or antenna beam, but rather must be applied across the entire system. While network control center 18 is illustrated in FIG. 1 as being separate from gateway 14, those skilled in the art will recognize that the network control center 18 includes functions, such as the antenna 18a, which are duplicated in the gateway 14, and that it may make economic sense to place the network control center 18, or the portions which together make up the network control center, at the site(s) of the gateway(s) such as gateway 14, so as to reduce the overall system cost by taking advantage of the redundancies to eliminate expensive subsystems.

The signals traversing antenna beam 20d between NCC 18 and spacecraft 12 of FIG. 1 represent control signals. "Forward" control signals proceed from the NCC 18 to the remainder of the communication system 10 by way of spacecraft 12, and "reverse" or "return" control signals are those which originate at terrestrial terminals other than the NCC, and which are sent to the NCC by way of the spacecraft. Forward control signals include, for example, commands from the NCC 18 to the various user terminals $16_x$, indicating which slot set is to be used by each user terminal for communication, while an example of a return control signal may be, for example, requests by various user terminals $16_x$, for access to the communication system 10. Other control signals are required, some of which are described in more detail below. As mentioned, those control signals flowing from NCC 18 to other portions of the communication system 18 are termed "forward" control signals, while those flowing in a retrograde direction, from the communication system 10 toward the NCC, are denominated "return" control signals.

The spacecraft 12 of FIG. 1 may need to produce many transmitted spot beams 20 from its antennas 12at and 12ar, and the transmissions over the spot beams may require substantial electrical power, at least in part because of the relatively low gain of the simple antennas 17 of the user terminals 16. In order to reduce the power required by the transmitters in the spacecraft, the largest number of downlink frequencies, namely those used for transmissions from the spacecraft to terrestrial user terminals, are desirably within a relatively low frequency band, to take advantage of increased component efficiencies (lower component losses) at the lower frequencies. The user terminals transmit to the spacecraft at the lower frequencies, for like reasons. The transmissions to and from the spacecraft from the NCC 18 and the gateway(s) 14 may be within a higher frequency band, in part because of FCC frequency allocation considerations, and in part to take advantage of high antenna gain available at the higher frequencies from large antennas at fixed installations, such as antennas 14a1 and 18a. In a specific embodiment of the invention, the uplinks and downlinks of the NCC and the gateways by way of antenna 72a may be at C-band (frequencies at about 3400 to 6700 MHz.), while the uplinks and downlinks of the user terminals by way of antennas 12at and 12ar are at L-band (frequencies at about 1500–1700 MHz). Thus, the downlink signals from transmit antenna 12at, by way of antenna beams 20a, 20b, and 20c of FIG. 1, are at frequencies within the relatively low L-band, while the uplink and downlink signals in antenna beams 20d and 20e of antenna 72a are at the higher C-band. The uplink signals from the terrestrial user terminals at L-band travel on receive spot beams (not illustrated in FIG. 1) of spacecraft receive antenna 12ar, which, at least in principle, correspond exactly with transmit beams 20a, 20b, and 20c. At the distances from the Earth's surface 1 at which geosynchronous spacecraft orbit, the distance between the transmit and receive antennas 12at and 12ar does not materially affect the beam correspondence, and even at low Earth orbit, is of almost no consequence.

FIG. 2 is similar to FIG. 1, except that, instead of illustrating the antenna beams $20_x$ (where the subscript x represents any one of the C- or L-band antenna beams) as a whole, some of the carriers contained in the beams are illustrated separately. For example, some of the forward control signals flowing from network control center 18 to C-band spacecraft antenna 72a over C-band antenna beam 20d are designated 105, 109, and 113, while some of the C-band return control signals flowing from antenna 72a of spacecraft 12 to the NCC 18 by way of antenna beam 20d are designated 106, 110, and 114. Each of these control signals is transmitted on a carrier of a different frequency, for reasons described below. Thus, the designations 105, 106, 109, 110, 113, and 114 in FIG. 2 may each be imagined to represent a different carrier frequency within C band. In practice in one embodiment of the invention under consideration, each of the forward control signals has a bandwidth of 200 KHz. As described below, each of the different uplinked control signal carriers will ultimately be routed to a different one of the L-band antenna downlink spot beams and its associated footprint; three footprints attributable to L-band downlinks are illustrated in FIGS. 1 and 2, so three uplinked forward control C-band signal carriers are illustrated, namely carriers 105, 109, and 113. Similarly, each of the different return control C-band signal carriers 106, 110, 114 downlinked from spacecraft 12 is generated by, or originates from, an L-band uplink from a user terminal 16 in a different one of the footprints illustrated in FIGS. 1 and 2; three footprints are illustrated, so the downlink portion of antenna beam 20e as illustrated includes the three carriers 106, 110, and 114.

As mentioned above in relation to the discussion of FIG. 1, the spacecraft 12 includes frequency-dependent channelizers 12c and frequency converters 12cv. The three forward control signals 105, 109, and 113 uplinked from NCC 18 of FIG. 2 to the spacecraft are received at antenna 72a of the spacecraft, and routed by way of receiver (RX) 12r to the channelizers 12c of the spacecraft, thence to an appropriate one of the frequency converters 12cv, where they are frequency converted to L-band. For example, uplinked forward control signal 105 of FIG. 2 arriving at antenna 12ar of the spacecraft over antenna beam 20d at C-band is converted from C-band to a frequency within L-band. In order to make it easy to track the flow of signals in FIG. 2, the L-band frequency corresponding to C-band frequency 105 is also designated 105. It is easy to keep the meaning of these identical designations in mind, by viewing them as identifying the control signals being transmitted; the forward control information on C-band uplink "frequency" 105 is retransmitted from the spacecraft, after frequency conversion to L-band, within antenna beam 20a produced by transmit antenna 12at, as downlink 105. Thus, the forward control signal information for all user terminals 16a lying within footprint 20af is uplinked from NCC 18 in C-band to the spacecraft over antenna beam 20d, and converted to L-band downlink frequency 105 at the spacecraft, and transmitted in the L-band form over antenna beam 20a for use by all user terminals 16a within footprint 20af. Similarly, uplinked control signal 109 arriving at the spacecraft over antenna beam 20d at C-band is converted from C-band to a frequency within L-band. In order to make it easy to track the flow of signals, the L-band frequency corresponding to C-band frequency 109 is also designated 109. The control information on C-band uplink "frequency" 109 is retransmitted from the spacecraft on L-band, within antenna beam 20b, as downlink 109. Thus, the forward control signal information for all user terminals 16b lying within footprint 20bf is uplinked from NCC 18 in C-band to the spacecraft over antenna beam 20d, and converted to an L-band downlink frequency 109 at the spacecraft, and transmitted in the L-band form over antenna beam 20b for use by all user terminals 16b within footprint 20bf. For completeness, control signals generated at NCC 18 for ultimate transmission to user terminals 16c in footprint 20cf is generated at C-band at a frequency 113 different from frequencies 105 and 109, and is uplinked from NCC 18 to spacecraft 12. The C-band control signal 113 received at spacecraft 12 is frequency-converted to a frequency, designated as 113, in L-band, and transmitted over antenna beam 20c for use by all user terminals 16c lying in footprint 20cf.

It should be noted that the fact that forward control signals are transmitted on the same carriers to a group of user terminals 16 of FIG. 2 lying in a particular footprint does not necessarily mean that all the user terminals lying within that footprint must operate simultaneously or in the same manner; instead, within each control signal carrier, a plurality of TDMA slots are available, and each set of slots is capable of being directed or assigned to a different one of the user terminals within the footprint being controlled, so that the user terminals are individually controllable. Of course, simultaneous reception of broadcast forward control signals by all user terminals within a footprint is possible, and all user terminals receive information signals "simultaneously," in that they may all be receiving transmissions at the same "time" as measured on a gross scale, although each individual message is received in a different time slot allocation. It should also be noted that, while control signals have not been described as being transmitted over antenna beam 20e between spacecraft 12 and gateway 14, the gateway (and any other gateways throughout the system) also require such control signal transmissions. In the event that the NCC and a gateway are co-located, the control signals flowing therebetween may be connected directly, rather than by being routed through the spacecraft.

When a user terminal $16_x$ (where the subscript x represents any one of the user terminals) of FIG. 2 is initially turned on by a user, the user terminal will not initially have an assigned slot. In order to advise the NCC 18 that the user terminal is active and wishes to be assigned a slot by which it may communicate, the user terminal must first synchronize to the forward control signals, and then transmit a reverse control signal to the NCC 18 by way of spacecraft 12, requesting access in the form of assignment of an information carrier time slot. Thus, in addition to the forward control signals flowing from NCC 18 to the user terminals $16_x$, additional return control signals also flow from the user terminals to the NCC 18. These control signals originating from the user terminals lying within a particular footprint are modulated onto uplink carriers at L-band and transmitted to the spacecraft, where they are converted to frequencies lying in C-band for transmission to the NCC 18. More particularly, return control signals originating at user terminals 16a lying within footprint 20af are modulated onto an L-band uplink carrier frequency designated as 106 in FIG. 2. The return control signals are received by spacecraft antenna 12ar and receiver 12r by way of spot beam 20a, and routed by channelizer 12c to the appropriate frequency converter of converter array 12cv for conversion to C-band frequency 106. C-band frequency 106 is routed by way of a C-band transmitter (not illustrated) to C-band transmit-receive antenna 72a, for transmission over antenna beam 20d to NCC 18. Similarly, return control signals originating at user terminals 16b lying within footprint 20bf are modulated onto an L-band uplink carrier frequency designated as 110 in FIG. 2. The return control signals are received by spacecraft antenna 12ar in beam 20b, and routed by channelizer 12c to the appropriate frequency converter 12cv for conversion to C-band frequency 110. C-band frequency 110 is routed by way of antenna 72a, for transmission over antenna beam 20d to NCC 18. For completeness, return control signals from user terminals 16c in footprint 20cf are modulated onto an L-band uplink carrier frequency designated as 114, and are received by spacecraft antenna 12ar in beam 20c, routed to the appropriate frequency converter 12cv, converted to C-band frequency 114, and transmitted over antenna beam 20d to NCC 18. Thus, NCC 18 transmits a single forward control signal carrier to each downlink spot beam 20a, 20b, 20c, . . . on an L-band carrier at a frequency which identifies the downlink spot beam to which the forward control signal is directed. NCC 18 receives return control signals from the various user terminals in footprints associated with the spot beams, and one return carrier is associated with each spot beam. In each spot beam, user terminals receive forward control signals over a carrier in an L-band downlink, and transmit return control signals over an L-band uplink. Spot beam 20a is associated with forward and return control signal carriers 105 and 106, respectively, spot beam 20b is associated with forward and return control signal carriers 109 and 110, respectively, and beam 20c is associated with forward and return control signal carriers 113 and 114, respectively.

Only the control signal carriers have been so far described in the arrangement of FIG. 2. The whole point of the communication system 10 is to communicate information signals among the users, so each antenna beam also carries signal carriers on which information signals are modulated or multiplexed by FDMA/TDMA, under control of the NCC 18. It should first be noted that NCC 18 of FIG. 2 does not need any information signal carriers (unless, of course, it is associated with a gateway terminal as described above). In general, information signals flow between gateways and user terminals. More particularly, signals from public switched telephone system 8 of FIG. 2 which arrive over data path 9 at gateway terminal 14 must be transmitted to the designated user terminal $16_x$ or other gateway $14_x$, which is likely to be served by an antenna beam other than beam 20d which serves gateway 14. Gateway 14 must communicate the identity of the desired recipient by way of a return control signal to NCC 18, and receive instructions as to which uplink carrier is to be modulated with the data from PSTN 8, so that the data carrier, when frequency-converted by the frequency converters 12cv in spacecraft 12, is routed to that one of the antenna beams which serves the desired recipient of the information. Thus, when information is to be communicated from gateway 14 to the remainder of communication system 10, it is transmitted on a selected one of a plurality of C-band uplink carriers, where the plurality is equal to the number of spot beams to be served. In the simplified representation of FIG. 2, three spot beams 20a, 20b, and 20c are served in the system, so gateway 14 must produce information signal carriers at three separate C-band uplink frequencies. These three carrier frequencies are illustrated as 107, 111, and 115. The information signal is modulated onto the appropriate one of the carriers, for example onto carrier 107, and transmitted to the spacecraft 12. At the spacecraft, the C-band carrier 107 is converted to an L-band frequency carrier, also designated 107, which is downlinked over spot beam 20a to those user terminals (and gateways, if any) lying in footprint 20af. Within footprint 20af, that particular one of the user terminals 16 to which the information signal is destined, and which has been assigned a TDMA slot set, recovers that portion of the frequency carrier 107 associated with the TDMA slot set, and therefore recovers the information signal. Similarly, information modulated at gateway 14 onto C-band uplink carrier 111, and transmitted to the spacecraft, is converted to L-band carrier 111, and downlinked over spot beam 20b to user terminals lying in footprint 20bf. For completeness, information modulated at gateway 14 onto C-band uplink carrier 115, and transmitted to the spacecraft, is converted to L-band carrier 115, and downlinked over spot beam 20c to user terminals lying in footprint 20cf. Within each footprint, the various user terminals select the information signals directed or addressed to them by selecting the particular time slot set assigned by NCC 18 for that particular communication.

Each user terminal lying in a footprint (and gateway, if any) of system 10 of FIG. 2 must be able to transmit information to the spacecraft for reradiation to a desired recipient. In general, all user terminals communicate only with gateways. If a user terminal of the system wishes to communicate with another user terminal of the system, the information may be routed first to one of the gateways, and then from the gateway back to the intended recipient user terminal. In one mode of operation, however, the user terminals may communicate directly with other user terminals in other spot beams. Thus, any user terminal 16a lying in footprint 20af of FIG. 2 communicates its information signals by modulating them onto (a selected slot set of) an L-band carrier 108. The transmission is received by antenna 12ar of spacecraft 12, and the signal is routed by way of channelizers 12c to the appropriate frequency converter of converter array 12cv, where conversion to a C-band frequency takes place. For example, L-band uplink information signal carrier 108 received by the spacecraft in spot beam 20a is converted to a C-band carrier frequency also designated 108, which is downlinked over antenna beam 20e to gateway 14. Similarly, L-band uplink information signal carrier 112 received by the spacecraft in spot beam 20b is converted to a C-band carrier frequency also designated 112, which is downlinked over antenna beam 20e to gateway 14, and uplink signal carrier 116 of antenna beam 20c is converted to downlink carrier 116 of antenna beam 20e to gateway 14. The user terminals (and gateways) in each spot beam thus transmit their information signals on uplink carriers having frequencies selected so that, after frequency conversion and channelization at the spacecraft, the resulting downlink carriers travel the particular antenna beam which is directed toward the recipient gateway. Similarly, signals originating at a gateway are modulated onto carriers which, after frequency conversion and channelizing at the spacecraft, traverse that one of the spot beams associated with the footprint in which the designated recipient is located. It should be noted that part of the system control performed by the NCC 18 is to determine the spot-beam in which a designated mobile recipient is located by keeping a record of the last location of each identifiable user, so that each spot beam does not have to be individually polled each time a connection to a mobile user is requested, to "find" the desired mobile user.

FIG. 3 illustrates details of one embodiment of spacecraft 12. As illustrated in FIG. 1, the spacecraft 12 includes a body 12b, which supports two deployed solar panel arrays $12_{s1}$ and $12_{s2}$. The spacecraft body 12b also supports deployed transmit antenna 12at and receive antenna 12ar. As mentioned, antennas 12at and 12ar preferably each produce a plurality of relatively narrow spot radiation beams directed towards the surface of the Earth. In one embodiment of the invention, the spot beams 20a, 20b, and 20c are less than two degrees wide (as conventionally measured at their 3 dB points).

FIG. 3 also illustrates a C-band antenna 72a, adapted for transmitting and receiving signals at C-band. As described below, these signals are communicated between a gateway terminal, or other fixed terrestrial terminal, and antenna 72a, for the described purposes. The pattern of spot receiving beams produced by antenna 12ar is ideally identical to the spot transmitting beams produced by antenna 12at, so that the radiation beams are congruent. Those skilled in the art of antennas know that, even if antennas 12at and 12ar produce identical beam patterns, misalignment between the transmit and receive antennas may result in misalignment of at least some of the spot beams, as a result of which some terrestrial terminals $16_x$ lying within one spot transmit beam will lie within a receive beam which does not correspond to the transmit beam. Such errors may also be caused by atenna integration misalignments or incorrect deployments may be due to (a) long-term or seasonal errors including thermal distortion, orbit and ephemeris uncertainty, (b) diurnal errors attributable to attitude control errors including gyro drift, (c) short-term errors due to reflector resonances and attitude control system error, and (d) residual errors.

Improved spacecraft-based cellular communication systems are desired.

SUMMARY OF THE INVENTION

A spacecraft cellular communication system according to an aspect of the invention includes a spacecraft body. A signal receiving and frequency conversion arrangement is mounted on the body, for receiving signals from terrestrial stations, and for converting signals received from terrestrial stations at specific frequencies within a first frequency band to other frequencies in a second frequency band. The first and second frequency bands may be mutually exclusive. At least one transmit antenna is supported by the spacecraft body. The transmit antenna includes an array of radiating elements and a first plurality of signal input ports coupled to the radiating elements of the array of radiating elements. The transmit antenna may be arranged so that signals applied to a signal input port of the transmit antenna causes radiation from one of the transmit antenna elements. A beamforming network is mounted on the spacecraft body. The beamforming network includes plural input ports, which are coupled to the receiving and frequency conversion arrangement, and it also includes a plurality of output ports coupled to the signal input ports of the transmit antenna array. The beamforming network receives, at its plural input ports, signals at the other frequencies within the second frequency band, and combines the signals at the other frequencies in a manner which, in combination with the transmit antenna, generates a plurality of spot radiation beams directed toward the Earth's surface. The spot radiation beams define overlapping footprints. The combination of the receiving and frequency conversion arrangement, the beamforming network, and the transmit antenna transmits signals at the other frequencies from the spacecraft to terrestrial user terminals located within the footprints. The communication system includes a fixed terrestrial terminal lying within the overlap region between at least first and second specific ones of the spot beams, for transmitting signals to the spacecraft at some of the specific frequencies within the first frequency range, for transmission of information signals to at least some of the terrestrial user terminals, as a result of which transmit antenna positional errors may cause the spot beams to be misdirected. The communication system further includes a transmit antenna positioning arrangement. The transmit antenna positioning arrangement comprises a beacon signal transmitter located at the fixed terrestrial terminal, for transmitting beacon signals, at a beacon frequency lying within the first frequency band, to the receiving and frequency conversion arrangement of the spacecraft. As a result, the receiving and frequency conversion arrangement converts the beacon signals lying within the first frequency band to beacon signals lying within the second frequency band. The transmit antenna positioning arrangement also includes a coupling arrangement coupled to the receiving and frequency conversion arrangement and to at least one of the input ports of the transmit antenna beamforming network, for coupling the beacon signals to the beamforming network in a manner which generates the first and second specific ones of the spot beams in a temporal sequence. A beacon signal receiver is located at the fixed terrestrial terminal, for receiving the beacon signals at the second frequency band, in their temporal sequence. An error determining arrangement is coupled to the beacon signal receiver, for comparing characteristics of the beacon signals in the temporal sequence, to determine pointing error of the transmit antenna. A controller is coupled to the error determining arrangement, for generating control signals for tending to move the spot beams to a condition in which the beacon signals have a common value of at least one of the characteristics. A suitable characteristic might be, for example, signal strength or amplitude.

In a particular embodiment of the invention, the receiving and frequency conversion arrangement includes an uplink receive antenna for receiving signals from terrestrial stations within the first frequency band, and the frequency conversion arrangement is coupled to the uplink receive antenna, for receiving signals within the first frequency band, and for converting signals received at specific frequencies within the first frequency band to other frequencies in the second frequency band. The first frequency band may comprise at least a part of C band, and the second frequency band may comprise at least a part of L band.

In one embodiment of the invention, the transmit multibeam antenna for the second frequency band comprises at least one reflector, and a feed element array coupled to the reflector. The feed element array may comprise an array of feed horns or other similar elements.

In one embodiment of the invention, the fixed terrestrial terminal is located in the overlap region between third and fourth specific ones of the spot beams. A first line joining the centers of the first and second specific ones of the spot beams is skewed relative to a second line joining the centers of the third and fourth specific ones of the spot beams. In a preferred embodiment, the skew angle between the first and second lines is 90°.

In a preferred embodiment of the invention, the coupling arrangement couples the beacon signals to the beamforming network in a manner which generates the third and fourth specific ones of the spot beams in a temporal sequence, and the controller generates the control signals for tending to move the spot beams to a condition in which the beacon signals associated with the first and second specific spot beams have a common value of at least one of the characteristics, and in which the beacon signals associated with the third and fourth specific spot beams have a common value of at least one of the characteristics. The characteristic may be signal amplitude or power level.

In one avatar or embodiment of the invention, the controller includes an arrangement for adjusting the attitude of the spacecraft body, and with it the antenna position. In another embodiment of the invention, the spacecraft also includes a receive multibeam antenna as well as the transmit antenna, and the controller includes an arrangement for adjusting both the position of the transmit and receive antennas relative to the spacecraft body.

BRIEF DESCRIPTION OF THE DRAWINGS

FIG. 7b is a plot of error voltage which may be produced from the antenna beams of FIG. 7a; and FIGS. 8 and 9 are simplified block diagrams of antenna alignment control systems according to an aspect of the invention.

DESCRIPTION OF THE INVENTION

Figure 3:
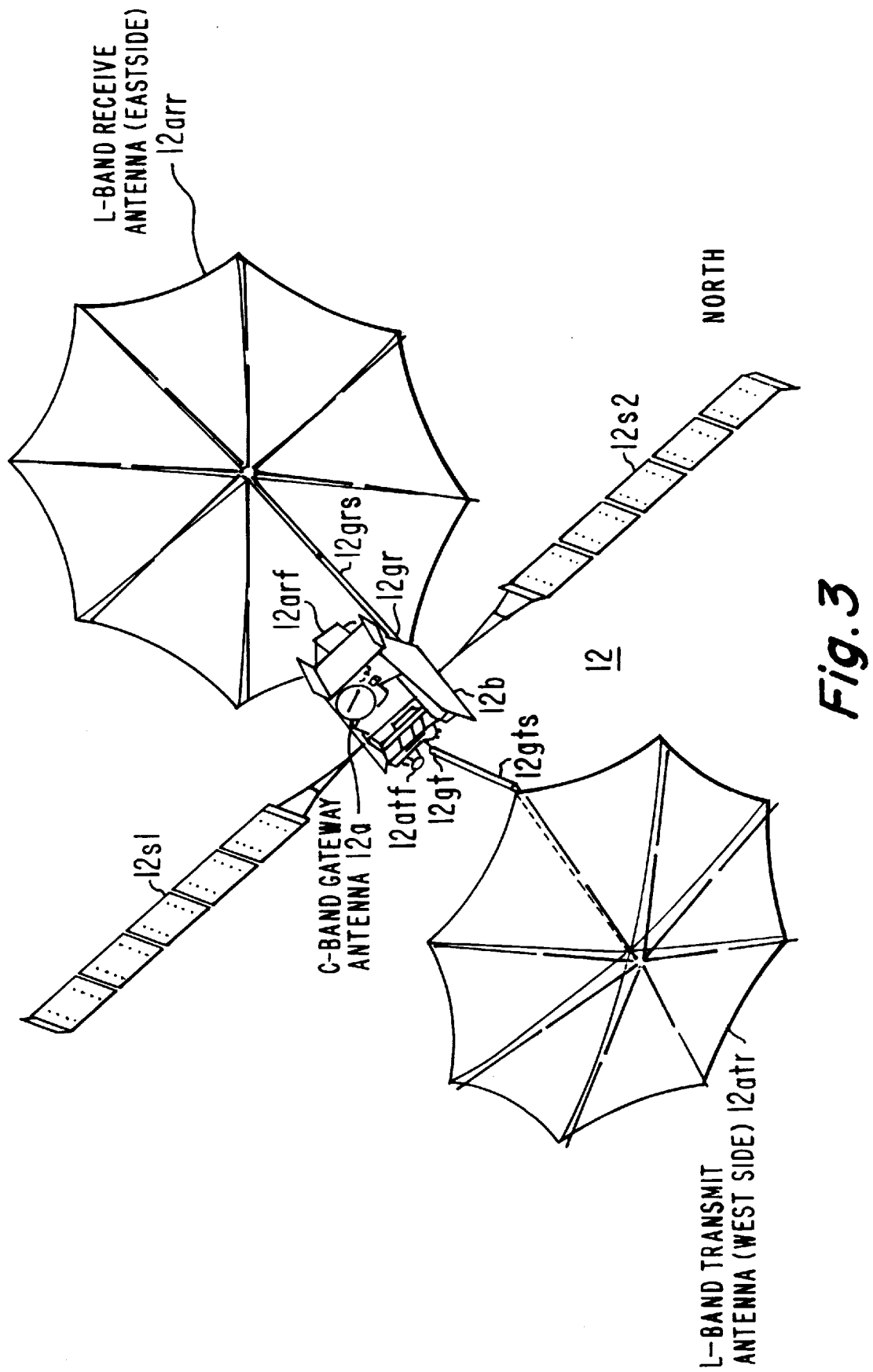
FIG. 3 is a simplified perspective or isometric view of the spacecraft of FIGS. 1 and 2 with its solar panels and antennas deployed.

As illustrated in FIG. 3, transmit multibeam antenna 12*at* takes the form, when deployed, of a parabolic reflector 12*atr* and a feed array 12*atf*. Feed array 12*atf* is mounted on the spacecraft body at a location near the focus of the parabolic reflector. Similarly, receive multibeam antenna 12*ar* includes a deployed reflector 12*arr* in conjunction with a feed array 12*arf*. In a preferred embodiment of the invention, the feed arrays include an array of feed horns. The gimbals 12*gt* and 12*gr* are mounted at the junctures of spacecraft body with reflector supports 12*gts* and 12*gtr*.

Figure 4:
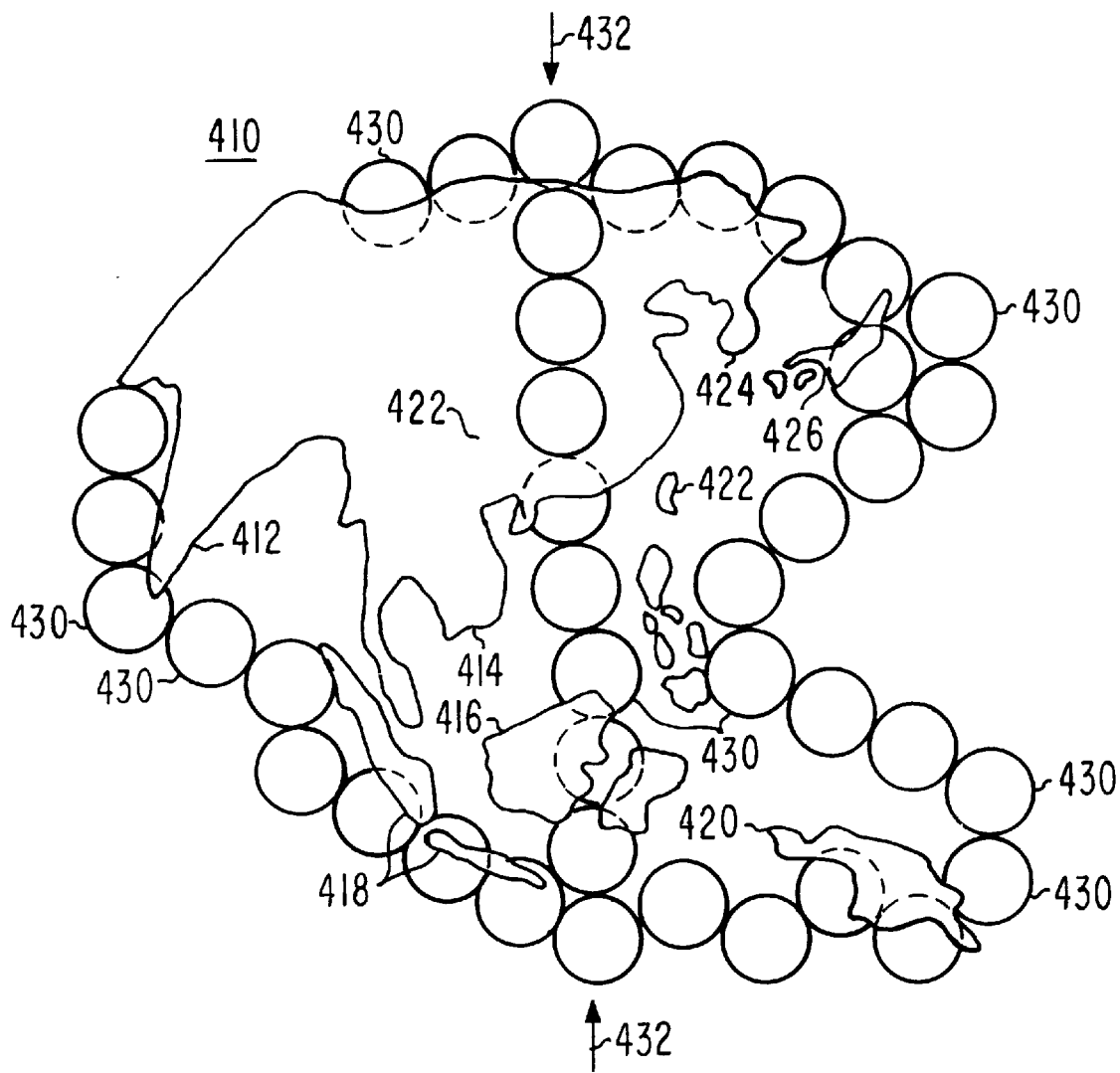
FIG. 4 is a simplified representation of the feed-horn array of one of the L-band transmit or receive antennas of the arrangement of FIG. 3, with a distorted representation of a reflector focal plane image of a portion of the continent of Asia superposed thereon.

FIG. 4 illustrates the layout of the horn apertures of feed horn arrangement 12*atf* of FIG. 3. In FIG. 4, a map of a portion of Asia is superposed on some of the circles representing apertures, distorted to appear as it would in the focal plane of the antenna from a spacecraft to the East of the Asian coast. More particularly, Asia, together with its principal islands is designated generally as 410, 412 represents India, 414 represents the combination of Vietnam, Cambodia, and Thailand, and 416 represents the island and mainland portions of Malaysia. Some of the islands of Indonesia are represented as 418. New Guinea is illustrated as 420, and Taiwan (Formosa) by 422. The Korean peninsula is 424, and the Japanese islands are represented as 426. The circles, some of which are designated 430, represent the apertures of the various feed horns of the feed array 12*atf* of transmit antenna 12*at* of FIG. 3. Not all of the feed horn apertures are illustrated, because there are eighty-eight feed horn apertures in the particular application described, and illustrating them all would make the illustration difficult to interpret. For the most part, the peripheral horns of the array have been illustrated, together with a line, which is illustrated by the arrows 432, of horns across the region being served. However, it will be understood that the entire continent of Asia, and its offshore islands out as far as the Philippines, are served by spot beams originating from the eighty-eight feed horn apertures which are illustrated, in part, in FIG. 4. More particularly, the feed horn array 12*atf* of FIGS. 1, 2, and 3 may be represented by the outline of FIG. 4, completely filled in by circles. The exact arrangement of the horn apertures is not particularly material to the invention, and the appropriate arrangement for use with a parabolic reflector will be readily understood to those skilled in the antenna arts. It should be noted that the circles of FIG. 4 do not represent the spot beam footprints themselves, but may roughly be conceived of as being a version of the footprints which each horn itself would form if it were energized independently, without a beamformer.

Figure 5:
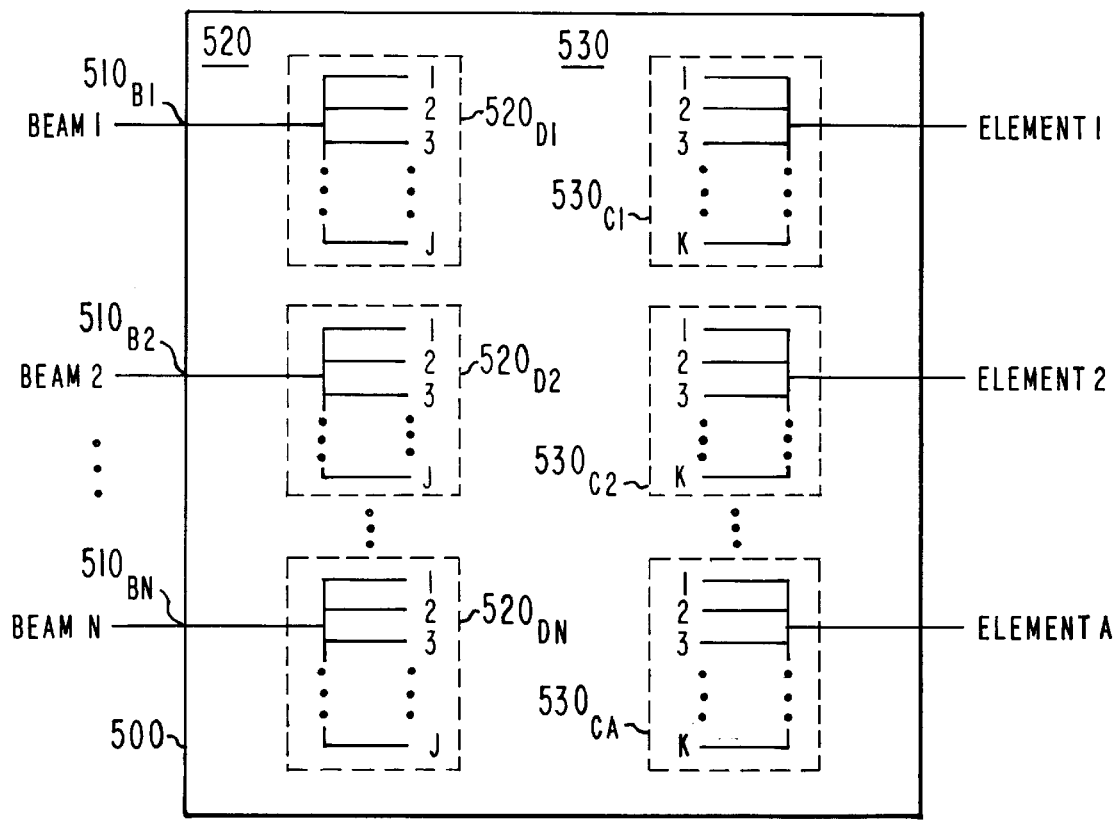
FIG. 5 is a simplified representation of a beamformer which may be used in conjunction with a feed-horn array to generate a plurality of spot beams.

FIG. 5 illustrates a beamformer arrangement 500 which is used in conjunction with transmitting antenna 12*at*, to allow A feed horns (where A is eighty-eight in the example) to produce a total of N spot antenna beams, where N is 140 in the example. In short, the beamformer combines the signals associated with, or "from" each feed horn with the signals from adjacent ones of the feed horns, in such a manner as to produce the desired beams. The beamformer 500 of FIG. 5 includes an "input" port (considering the antenna in its transmitting mode) for each of the N beams to be generated from the antenna; the input ports are then $510_{B1}, 510_{B2}, \ldots, 510_{BN}$, where N represents the total number of beams to be generated, namely 140 beams in the example. The ports $510_{B1}, 510_{B2}, \ldots, 510_{BN}$ are coupled to an RF power divider network designated generally as 520. Network 520 includes a plurality N of individual beam power divider networks $520_{D1}, 520_{D2}, \ldots, 520_{DN}$, each of which transforms a single one of the signals applied to a port $510_{B1}, 510_{B2}, \ldots,$ or $510_{BN}$ into J output signals, each having a specified amplitude weighting and phase weighting, all as known in the art, which J output signals, when applied to a like number J of antenna radiating elements, produce a beam in space. The power division for weighting is typically accomplished by junctions of several transmission-line sections having various selected relative impedances, or by couplers formed by transmission lines spaced from each other by specific distances over specific lengths. Phase weighting is ordinarily accomplished by selecting among various physical lengths of transmission line, which inherently have different electrical lengths. The outputs of each of the power dividers $520_{D1}, 520_{D2}, \ldots, 520_{DN}$ of set 520 are coupled to input ports of a plurality of power combiners $530_{C1}, 530_{C2}, \ldots, 530_{CA}$, where A is the number of separate radiating elements of the array which are to be involved in the generation of each beam. Each power combiner $530_{C1}, 530_{C2}, \ldots, 530_{CA}$ of set 530 combines the signals from K of the power dividers, and couples the powers so combined to the associated one of the A antenna elements.

According to an aspect of the invention, the transmit multibeam antenna 12*at* is aligned by use of a fixed ground station located in a region lying between adjacent ones of the spot beams. The spacecraft transmits a beacon signal over the beams, and the beacon signals on the beams are received by the fixed site. One or more characteristics of the multiple beacon signals received over the various beams are processed to determine the deviation of the spacecraft antenna from its proper position. A control signal is generated from the deviation information, which ultimately restores the transmit antenna to its proper position. More particularly, if the fixed ground station is located at a position which is ideally half-way between two adjacent spot beams, one of which is east, and one west of the location, a signal transmitted by way of both beams with equal amplitude should be received at the fixed site with equal amplitudes if the antenna in question is properly aligned. A deviation in amplitude is indicative of an error in positioning.

Figure 6:
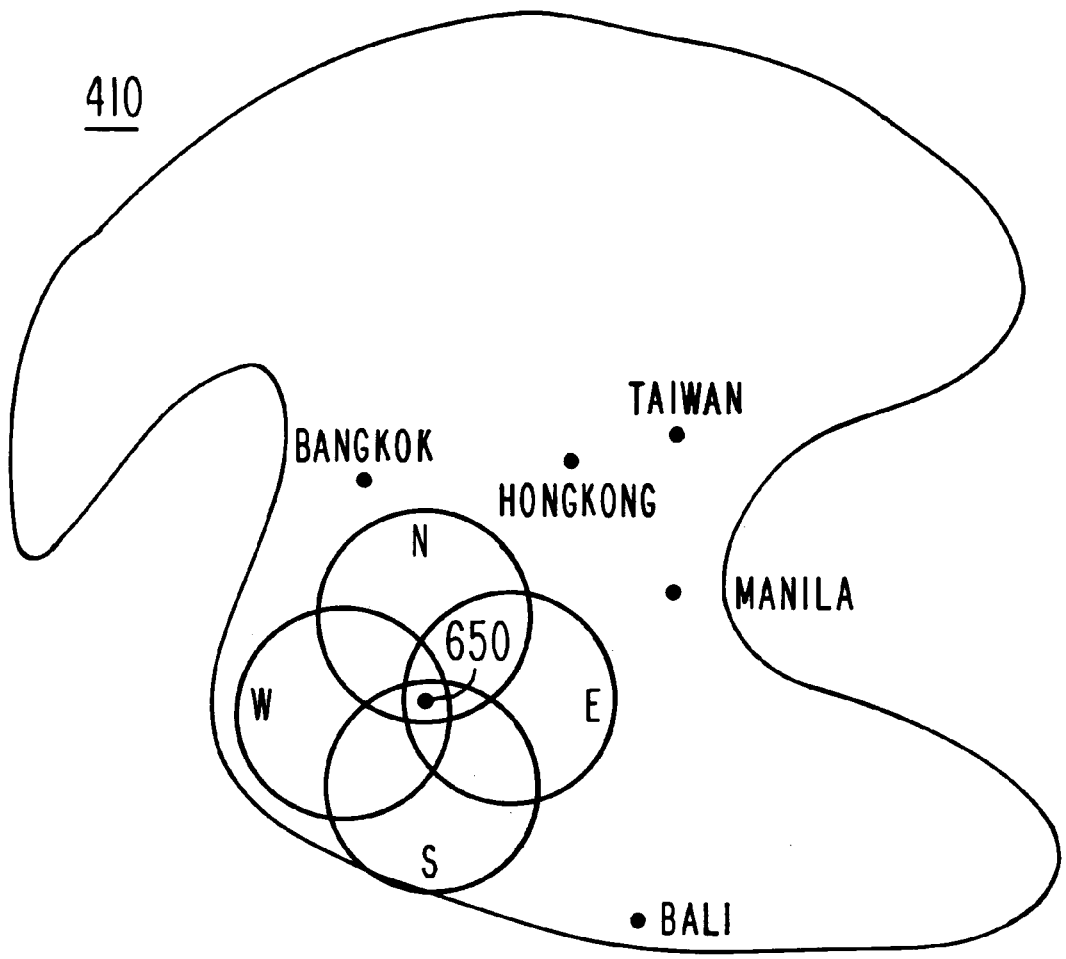
FIG. 6 illustrates a portion of Asia from FIG. 4, showing four spot beam footprints overlapping Batam.

FIG. 6 illustrates a portion of the region of Asia previously illustrated in FIG. 4, showing four spot beam footprints designated N, S, E, and W, which are made larger than their actual dimensions for ease of representation. The four footprints overlap at a dot which represents Batam, at which a fixed terrestrial Beacon Reference Terminal (BRT) site will be used to receive the beacon signals, for adjusting the position of the transmit antenna 12*at* in a manner which aligns it with the underlying surface. The receive antenna 12*ar* is aligned in a similar manner, so that both the transmit antenna 12*at* and the receive antenna 12*ar* are aligned with a feature of the target surface, and therefore with each other.

Figure 7A:
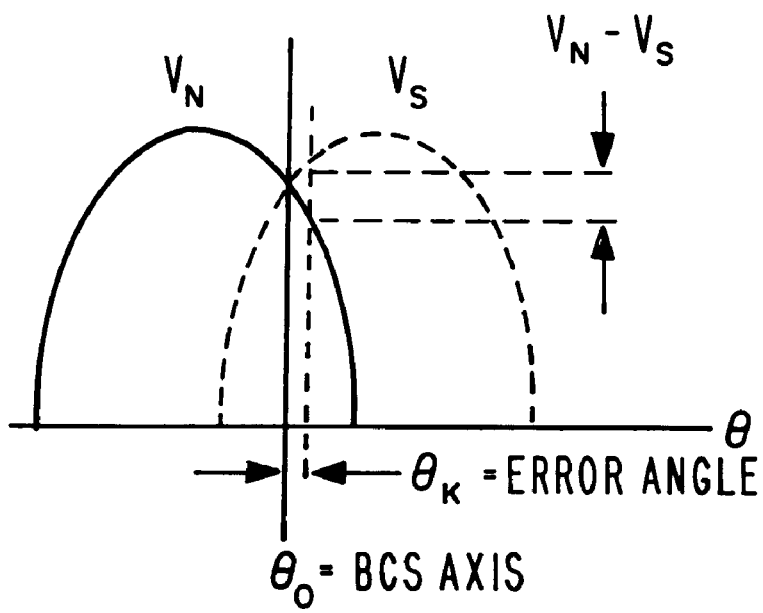
FIG. 7a illustrates two adjacent antenna beams which overlap.
Figure 7B:
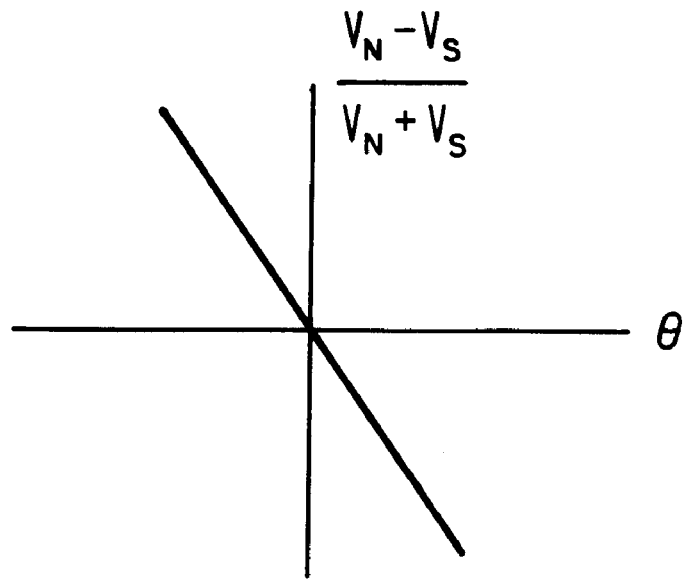

FIG. 7*a* illustrates two adjacent antenna beams $V_N$ and $V_S$, which overlap symmetrically about a solid vertical line at an angle designated, which represents a symmetrical overlap of the beams at θ=0°. If a misalignment occurs, so that t he fixed terrestrial terminal is located at an error angle $θ_K$, a difference results between the signals received on or from the two antenna beams $V_N$ and $V_S$, in an amount $V_N–V_S$. FIG. 7*b* is a plot of an error voltage which results from processing the difference signal $V_N–V_S$ by normalization, $(V_N–V_S)/(V_N+V_S)$, showing how a misalignment results in a linear change of the error signal relative to angular displacement.

FIG. 8 is a simplified block diagram of an antenna alignment control system according to an aspect of the invention. In FIG. 8, a Frequency Generation unit (FGU) 810 generates a baseband beacon signal, which is applied to an upconverter 812. The upconverted beacon signal is applied to a clocked one-of-four switch 816, which sequentially applies the upconverted beacon signal to inputs of the beamformer 818 corresponding to the N, S, E, and W beams illustrated in FIG. 7*a*. The beacon signal is transmitted in time sequence from the feed array 12*atf* of transmit antenna 12*t* over the N, S, E, and W beams. The beacon signals are received in time sequence at L-band antenna 14*a*2 at the fixed terrestrial Beacon Reference Terminal (BRT) 14$_{BRT}$. The received beacon signals are applied from to a clocked error signal generator 820, which removes or demodulates the time sequence using a switch arrangement T1, T2, T3, T4 synchronized to the corresponding switches of beam selection switch 816, and temporarily stores the resulting four signals in stores (not illustrated). The four stored signals represent the beacon signals $V_N$, $V_S$, $V_W$, and $V_E$ received by BRT receiver 14$_{BRT}$ from each of the N, S, E, and W beams. The $V_N$ and $V_S$ signals are applied to a subtractor 821 to produce signals representative of $V_N–V_S$, and the $V_N$ and $V_S$ signals are applied to an adder 822 to produce a signal representative of $V_N+V_S$. Similarly, the $V_W$ and $V_E$ signals are applied to a subtractor 823 to produce signals representative of $V_E–V_W$, and the $V_W$ and $V_E$ signals are applied to an adder 824 to produce a signal representative of $V_E+V_W$. The $V_N–V_S$, and $V_N+V_S$ signals are applied to a divider 826 to produce a normalized error signal $V_{error\ NS}$ $$V_{error\ NS}=(V_N-V_S)/(V_N+V_S)$$

to determine the north-south error. The $V_W–V_E$, and $V_W+V_E$ signals are applied to a divider 828, to produce a signal representing an EW error signal $V_{error\ EW}$ $$V_{error\ EW}=(V_E-V_W)/(V_E+V_W)$$

The NS and EW error signals are applied by way of first and second signal paths to a computer 840. The first signal path includes a buffer 831, an analog-to-digital converter (ADC) 832, and an error processor (E-P) 833, and the second signal path includes a buffer 834, ADC 835, and E-P 836. Computer 840 converts the error value to signals which can be transmitted by antenna 14*a*1 over a C-band uplink 850 to C-band antenna 72*a* of the spacecraft 12, for two-axis control of the gimbal 12*gt* by which the transmit antenna 12*at* is supported. The arrangement of FIG. 8 controls the gimbal 12*gt* in the NS and EW planes under control of the two error signals in a manner which maintains the four N, S, E, and W antenna beams centered about the Batam BRT.

It should be noted that, in the arrangement of FIG. 8, the processing by taking differences and dividing which is performed in blocks 821, 822, 823, 824, 826, and 828 is illustrated as being performed by analog processing blocks, which might be at RF frequencies, or it might be at intermediate frequencies, if an appropriate frequency converter were used in BRT receiver 14$_{BRT}$. As an alternative, the BRT receiver 14$_{BRT}$ may perform analog-to-digital conversion, so that all the processing performed in block 820 is performed by a digital processor (or a portion of a digital processor), thereby eliminating the need for analog-to-digital converters 832 and 834.

Figure 1:
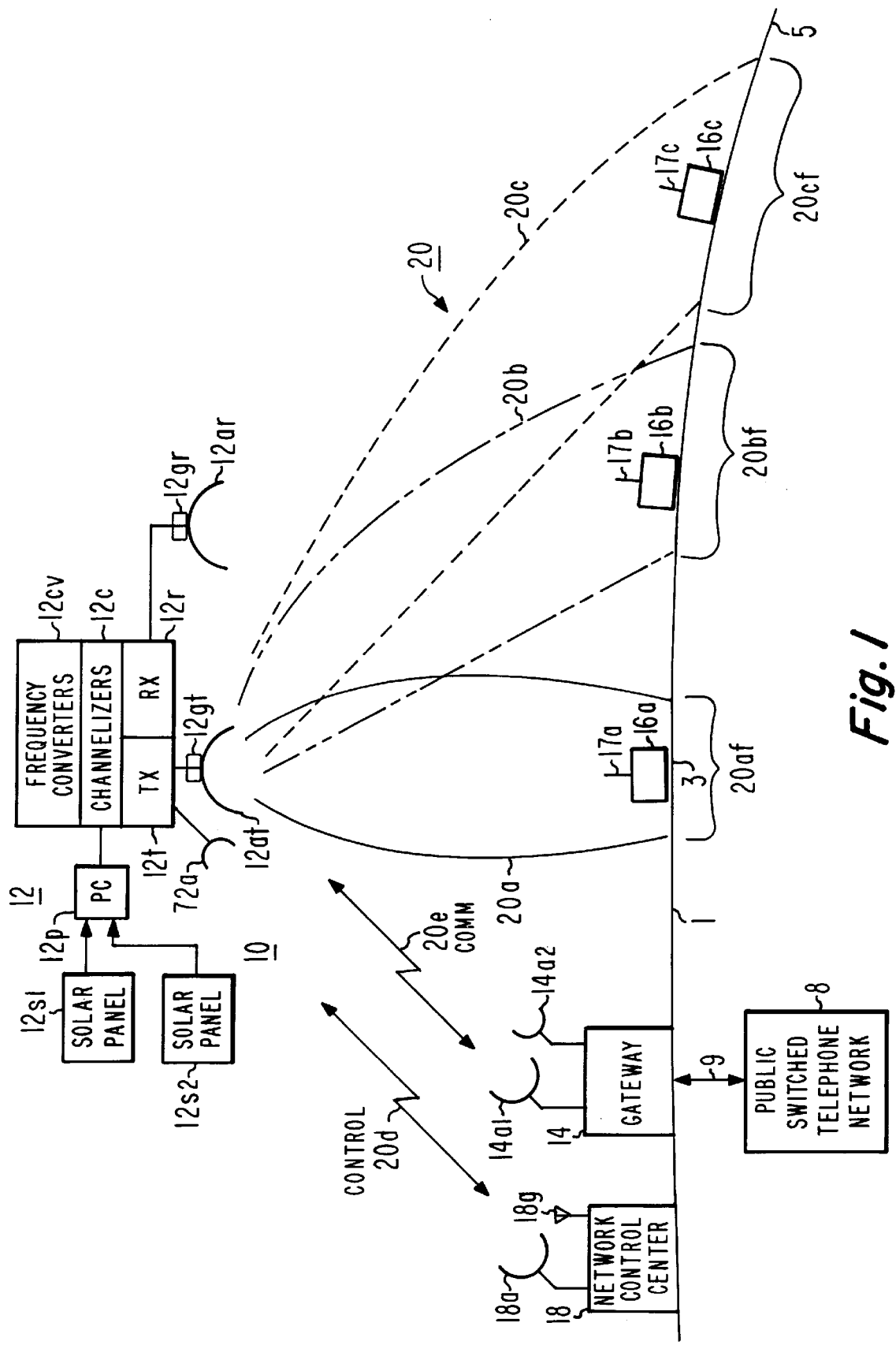
FIG. 1 is a simplified diagram of a spacecraft cellular communications system, illustrating some antenna beams which define system cells.
Figure 2:
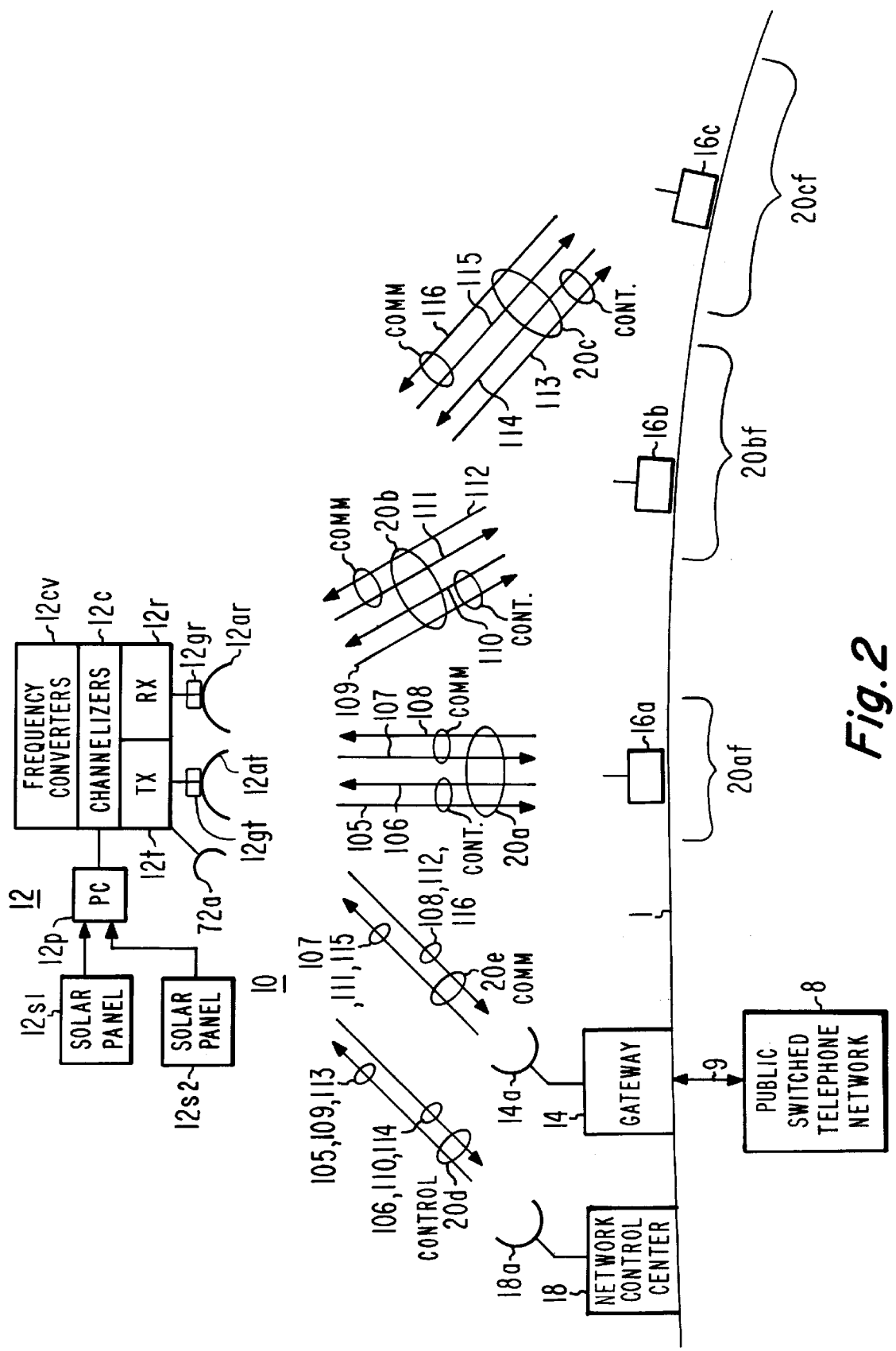
FIG. 2 is a simplified diagram similar to FIG. 1, illustrating some of the signals which flow over the various antenna beams.
Figure 9:
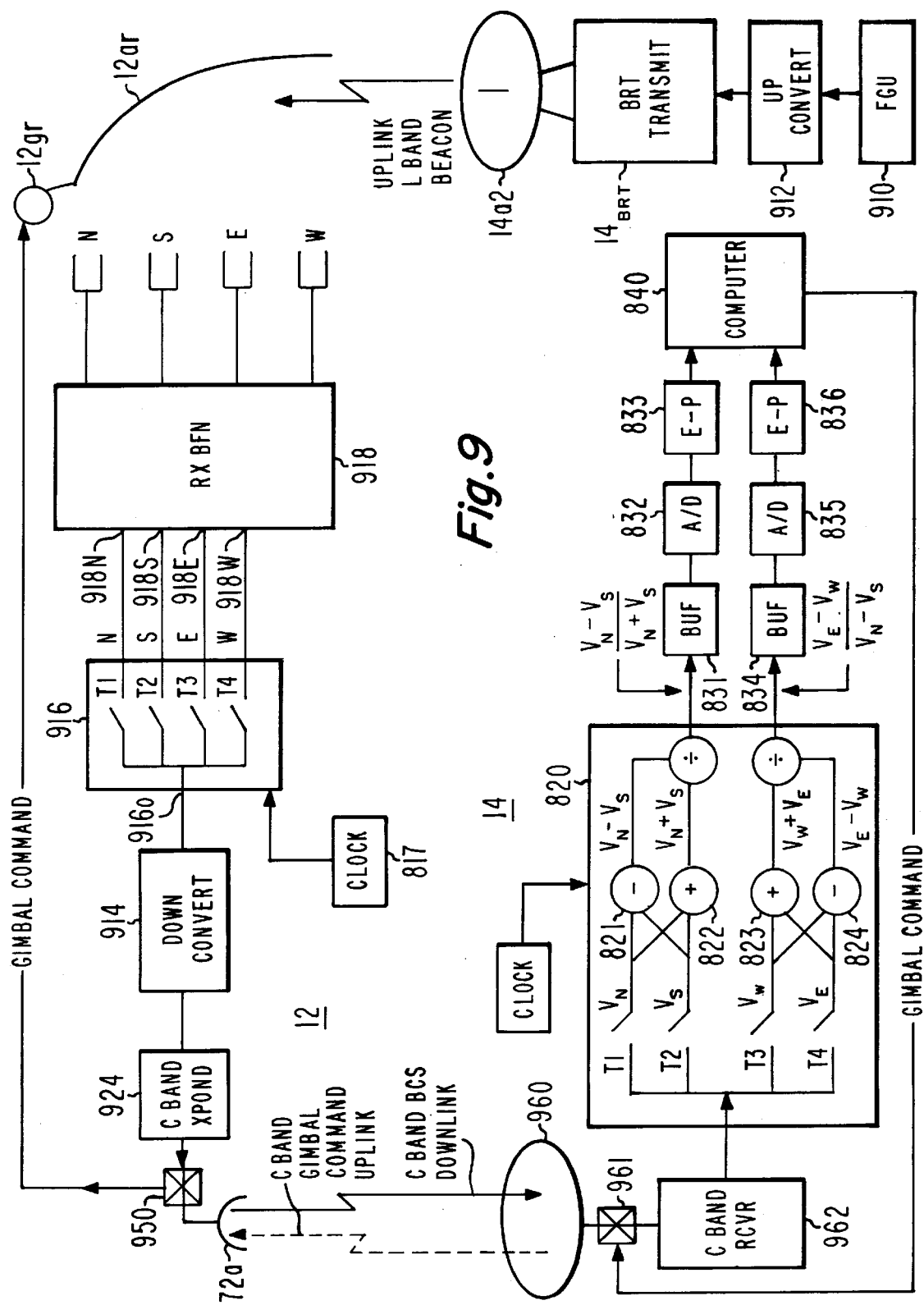

FIG. 9 is a simplified block diagram which illustrates a corresponding control arrangement for receive antenna 12*ar* of FIGS. 1, 2, and 3. The system of FIG. 9 operates in the same fundamental manner as the arrangement of FIG. 8, but is arranged so that the receiving antenna 12*ar* is required only to receive, rather than transmit. In FIG. 9, elements corresponding to those of FIG. 8 are designated by like reference numerals. In FIG. 9, a baseband beacon signal is generated by a frequency generator unit (FGU) 910, and is upconverted to L-band by a frequency converter 912. The up-converted signal is transmitted from antenna 14*a*2 toward spacecraft 12. In addition to the other functions performed by the receiving antenna 12*ar* of spacecraft 12, it produces four beams which are centered about the BRT 14 location. These beams are available at ports 918N, 918S, 918E, a nd 918W of the beamforming network (BFN) 918. The beacon signal appears simultaneously at beamformer ports 918N, 918S, 918E, and 918W, and the signals are applied from the beamformer ports to switches T1, T2, T3, and T4 of commutating switch 916. The four switches T1, T2, T3, and T4 are closed (contact is made) in time sequence under the control of clock 917, so that the four received beacon signals appear in time sequence at output port 916*o* of commutating switch 816. The commutated beacon signal is coupled from output port 916*o* to a downconverter 914, where the beacon signal is converted to baseband, but has the modulation of the antenna beam switching.

The downconverted, commutated beacon signal needs to be relayed to the ground, where the error is processed. In order to accomplish the relaying of the downconverted, commutated beacon signal to the ground without using additional dedicated beacon tracking equipment, such as an on-board receiver and processor, the downconverted, commutated beacon signal is converted by downconverter 914 of FIG. 9 to C-band (in one embodiment), and applied from downconverter 914 to a C-band transponder 924, otherwise necessary in the spacecraft for transmission of the C-band information signals, which converts the commutated baseband beacon signal to C-band, for transmission by way of a transmit-receive device 950 to antenna 72*a* for transmission to gateway ground station 14. The C-band signal from antenna 72*a* traverses the downlink to antenna 960 and is coupled by a transmit-receive device 961 to a C-band receiver 962. Receiver 962 demodulates the commutated beacon signal, and makes it available to a further synchronized commutator and processor 820, which is identical in principle to element 820 of FIG. 8. Synchronized commutator and processor 820 of FIG. 9 generates error signals in the same manner as that described in conjunction with FIG. 8, and couples the error signals by way of buffers 831 and 834, ADCs 832 and 835, and error processors 833 and 836 to computer 840. It will be recognized that the structure extending from block 820 to block 840 of FIG. 9 is identical to the similar structure of FIG. 8, and operates in the same manner to produce correction signals at the output of computer 840. The correction signals are coupled from computer 840 of FIG. 9 to transmit-receive device 961, and are coupled by way of antenna 960 and an uplink path to antenna 72a. From antenna 72a, transmit-receive device 950 directs the correction signals to gimbal 12gr, for correcting the position of receive antenna 12ar. Thus, the commutated beacon signal is transmitted from the spacecraft to the ground station at C-band, and the beacon signal is extracted at the ground station and processed as in FIG. 8. This technique avoids burdening the spacecraft with dedicated equipment used only by the beacon.

Thus, in general, the invention relates to a spacecraft communication system (10), which includes a transmit antenna arrangement (12at) mounted on the spacecraft (12), for generating a plurality of transmit spot beams (20a, 20b, 20c) directed toward the Earth. Each of the transmit spot beams (20a, 20b, 20c) defines a footprint (20af, 20bf, 20cf), and is for transmitting communications to at least user terminals (16) located within the footprint (20$_{af}$, 20$_{bf}$, 20$_{cf}$) associated with the transmit spot beam (20a, 20b, 20c). A receive antenna arrangement (12ar) is mounted on the spacecraft (12), for generating a like plurality of receive spot beams directed toward the Earth, each of which defines a footprint (20$_{af}$, 20$_{bf}$, 20$_{cf}$), which ideally coincides with the footprint (20$_{af}$, 20$_{bf}$, 20$_{cf}$) of a corresponding transmit spot beam. Each of the receive spot beams of the receive antenna is for receiving communications from at least user terminals (16) located within the footprint (20$_{af}$, 20$_{bf}$, 20$_{cf}$) associated with the receive spot beam. A control arrangement (810, 812, 816, 820–840, 850, 12gt) is coupled to the transmit antenna, for causing the footprint (20$_{af}$, 20$_{bf}$, 20$_{cf}$)s of at least some of the transmit spot beams to assume a predetermined condition relative to a location on the Earth. A further control arrangement (910, 914, 916, 918, 920, 950, 960, 962, 820–840, 12gr) is coupled to the receive antenna 12ar, for causing the footprint (20$_{af}$, 20$_{bf}$, 20$_{cf}$)s of at least some of the receive spot beams to assume the same predetermined condition relative to the location on the Earth. In one embodiment of the invention, the location (Batam) is fixed. In one embodiment (FIG. 8) of the invention, the control arrangement coupled to the transmit antenna includes (a) a beacon signal generator (810), (b) a commutator (816) coupled to the beacon signal generator(810) and to the transmit antenna 12at), for causing the beacon signal to be transmitted on different beams (N, S ,E, W) of the transmit antenna (12at) at different times, (c) a receiver (14a2, 14$_{BRT}$) at the location, for receiving, at the different times, at least some of the beacon signals transmitted on the different beams (N, S ,E, W), to form received beacon signals, (d) a processor (820, 831, 832, 833, 834, 835, 836, 840) coupled to the receiver, for processing the received beacon signals, and for forming error signals therefrom indicative of deviation of the transmit antenna from a desired position, and (e) an antenna position control arrangement (14, 14a1, 850, 72a, 12gt) coupled to the processor (820, 831, 832, 833, 834, 835, 836, 840) and to the transmit antenna (12at), for causing the transmit antenna (12at) to move toward the desired position. In one embodiment of the invention, the control arrangement coupled to the receive antenna includes (a) a beacon signal generator, (b) a transmitter at the location, and coupled to the beacon signal generator, for forming transmitted beacon signals, (c) a commutator coupled to the receive antenna for receiving the beacon signal on different beams of the receive antenna at different times, for thereby generating received beacon signals, (d) a processor coupled to the commutator, for processing the received beacon signals, and for forming error signals therefrom indicative of deviation of the receive antenna from a desired position, and (e) an antenna position control arrangement coupled to the processor and to the receive antenna, for causing the receive antenna to move toward the desired position.

More particularly, a spacecraft cellular communication system (10) according to an aspect of the invention includes a spacecraft (12) with a body (12b). A signal receiving and frequency conversion arrangement (12r, 12c, 12cv) is mounted on the body (12b), for receiving signals from terrestrial stations (18, 20), and for converting signals received from terrestrial stations (18, 20) at specific frequencies (105, 107, 109, 111, 113, 115) within a first frequency (C) band to other frequencies (105, 107, 109, 111, 113, 115) in a second frequency band (L). The first (C) and second (L) frequency bands may be mutually exclusive. At least one transmit antenna (12at) is supported by the spacecraft body (12b). The transmit antenna (12at) includes an array (12atf) of radiating elements (N, S ,E, W) and a first plurality of signal input ports (819N, 819S, 819E, 819W) coupled to the radiating elements (N, S ,E, W) of the array (12atf) of radiating elements (34e). The transmit antenna (12at) may be arranged so that signals applied to a signal input port (819N, 819S, 819E, or 819W) of the transmit antenna (12at) causes radiation from one of the transmit antenna elements (N, S ,E, W). A beamforming network (818) is mounted on the spacecraft body (12b). The beamforming network (500, 818) includes plural input ports (818N, 818S, 818E, or 818W), which are coupled to the receiving and frequency conversion arrangement (12r, 12c, 12cv), and it also includes a plurality of output ports (819N, 819S, 819E, 819W) coupled to the signal input ports (898N, 898S, 898E, 898W) of the transmit antenna array (12atf). The beamforming network (500, 818) receives, at its plural input ports, signals at the other frequencies within the second frequency (L) band, and combines the signals at the other frequencies in a manner which, in combination with the transmit antenna, generates a plurality of spot radiation beams (22) directed toward the Earth's surface (1). The spot radiation beams (22) define overlapping footprints (22f). The combination of the receiving and frequency conversion arrangement (12r, 12c, 12cv), the beamforming network (500, 818), and the transmit antenna (12at) transmits signals at the other frequencies from the spacecraft (12) to terrestrial user terminals (18, 20) located within the footprints (22f). The communication system (10) includes a fixed terrestrial terminal (14) lying within the overlap region (650) between at least first (N, E) and second (S, W) specific ones of the spot beams (22), for transmitting signals to the spacecraft (12) at some of the specific frequencies within the first frequency (C) band, for transmission of information signals to at least some of the terrestrial user terminals (14), as a result of which transmit antenna (12at) positional errors may cause the spot beams (22) to be misdirected. The communication system further (10) includes a receive antenna positioning arrangement (FIG. 9). The receive antenna positioning arrangement (FIG. 9) comprises a beacon signal transmitter (910, 912, 14, 14a2) located at the fixed terrestrial terminal (20), for transmitting beacon signals, at a beacon frequency lying within the first frequency (C) band, to the receiving and frequency conversion arrangement (12r, 12cv) of the spacecraft. As a result, the receiving and frequency conversion arrangement (12r, 12cv) converts the beacon signals lying within the first frequency band to beacon signals lying within the second frequency band. The receive antenna positioning arrangement also includes a coupling arrangement coupled to the receiving and frequency conversion arrangement and to at least one of the input ports of the beamforming network, for coupling the beacon signals to the beamforming network in a manner which generates the first and second specific ones of the spot beams in a temporal sequence. A beacon signal receiver is located at the fixed terrestrial terminal, for receiving the beacon signals at the second frequency band, in their temporal sequence. An error determining arrangement is coupled to the beacon signal receiver, for comparing characteristics of the beacon signals in the temporal sequence, to determine pointing error of the transmit antenna. A controller is coupled to the error determining arrangement, for generating control signals for tending to move the spot beams to a condition in which the beacon signals have a common value of at least one of the characteristics. A suitable characteristic might be, for example, signal strength or amplitude.

In a particular embodiment of the invention, the receiving and frequency conversion arrangement includes an uplink receive antenna for receiving signals from terrestrial stations within the first frequency band, and the frequency conversion arrangement is coupled to the uplink receive antenna, for receiving signals within the first frequency band, and for converting signals received at specific frequencies within the first frequency band to other frequencies in the second frequency band. The first frequency band may comprise at least a part of C band, and the second frequency band may comprise at least a part of L band.

In one embodiment of the invention, the transmit antenna comprises at least one reflector, and a feed element array coupled to the reflector. The feed element array may comprise an array of feed horns.

In one embodiment of the invention, the fixed terrestrial terminal is located in the overlap region between third and fourth specific ones of the spot beams. A first line joining the centers of the first and second specific ones of the spot beams is skewed relative to a second line joining the centers of the third and fourth specific ones of the spot beams. In a preferred embodiment, the larger skew angle between the first and second lines is 90°.

In a preferred embodiment of the invention, the coupling arrangement couples the beacon signals to the beamforming network in a manner which generates the third and fourth specific ones of the spot beams in a temporal sequence, and the controller generates the control signals for tending to move the spot beams to a condition in which the beacon signals associated with the first and second specific spot beams have a common value of at least one of the characteristics, and in which the beacon signals associated with the third and fourth specific spot beams have a common value of at least one of the characteristics. The characteristic may be signal amplitude or power level.

In one avatar of the invention, the controller includes an arrangement for adjusting the attitude of the spacecraft body, and with it the antenna position. In another embodiment of the invention, the spacecraft also includes a receive antenna as well as the transmit antenna, and the controller includes an arrangement for adjusting the position of the transmit and receive antenna relative to the spacecraft body.

Other embodiments of the invention will be apparent to those skilled in the art. For example, while the frequencies have been specified as in the C and L bands, other frequency bands may be used. The spot-beam antenna may be any kind of antenna, such as an array antenna without reflector, or it may be an active array. While the communication system of the example covers Asia and the fixed site is at Singapore, the coverage may be of any part of the globe, and the fixed station may be located anywhere within the coverage region. While, in the description of FIG. 2, each uplink control signal carrier, such as 105, 109, and 113 is routed to a different one of the antenna beams, a plurality of uplink carriers may be routed to a spot antenna beam; similarly, plural ones of the uplink communication carriers, such as uplink communication carriers 107, 111, and 115, may be routed over a spot beam; as an example, if uplink communication beam 20e of FIG. 1 were to have additional communication carriers designated 205, 207, and 213, communication carriers 107 and 207 might be routed at the spacecraft so as to be transmitted on downlink antenna beam 20a, and communication carriers 115, 205, and 213 might be transmitted on downlink antenna beam 20c. While the four beams have been described as N, S, E and W, there is no particular reason that cardinal directions must be used, and any approximately orthogonal directions should be satisfactory. In the same manner, it is assumed that the BRT at Batam is centered between the two beams in each correction plane, but it would not have to be centered if a bias amplitude offset were to be applied, so that the "rest" position of the two beams in a given correction plane were at a different amplitude contour of the two footprints.

What is claimed is:

1. A spacecraft cellular communication system, comprising:

a spacecraft including a body;

a receiving and frequency conversion arrangement mounted on said body, for receiving signals from terrestrial stations, and for converting signals received from terrestrial stations at specific frequencies within a first frequency band to other frequencies in a second frequency band, which second frequency band does not include said first frequency band;

at least one antenna supported by said body, said antenna including an array of radiating elements and a first plurality of signal input ports coupled to said radiating elements of said array of radiating elements;

a beamforming network mounted on said body, said beamforming network including plural input ports coupled to said receiving and frequency conversion arrangement, and a plurality of output ports coupled to said signal input ports of said antenna array, for receiving signals at said other frequencies within said second frequency band at said plural input ports, and for combining said signals at said other frequencies in a manner which, in combination with said antenna, generates a plurality of spot radiation beams directed toward the Earth's surface, said spot radiation beams defining overlapping footprints, for transmitting signals at said other frequencies from said spacecraft to terrestrial user terminals located within said footprints;

a fixed terrestrial terminal lying within the overlap region between at least first and second specific ones of said spot beams, for transmitting signals to said spacecraft at some of said specific frequencies within a first frequency range, for transmission of information signals to at least some of said terrestrial user terminals, whereby antenna positional errors may cause said spot beams to be misdirected; and an antenna positioning arrangement, said antenna positioning arrangement comprising:

(a) beacon signal transmitting means located at said fixed terrestrial terminal, for transmitting beacon signals to said receiving and frequency conversion arrangement at a beacon frequency lying within said first frequency band, whereby said receiving and frequency conversion means converts said beacon signals lying within said first frequency band to beacon signals lying within said second frequency band;

(b) coupling means coupled to said receiving and frequency conversion means and to at least one of said input ports of said beamforming network, for coupling said beacon signals to said beamforming network in a manner which generates said first and second specific ones of said spot beams in a temporal sequence;

(c) beacon signal receiving means located at said fixed terrestrial terminal, for receiving said beacon signals at said second frequency band in said temporal sequence;

(d) error determining means coupled to said beacon signal receiving means, for comparing characteristics of said beacon signals in said temporal sequence, to determine pointing error of said antenna; and (e) control means coupled to said error determining means, for generating control signals for tending to move said spot beams to a condition in which said beacon signals in said temporal sequence have a common value of at least one of said characteristics.

2. A system according to claim 1, wherein said receiving and frequency conversion arrangement comprises: uplink receive antenna means for receiving signals from terrestrial stations within said first frequency band; and frequency conversion means coupled to said uplink receive antenna means, for receiving signals within said first frequency band, and for converting signals received at specific frequencies within said first frequency band to other frequencies in said second frequency band.

3. A system according to claim 2, wherein said first frequency band comprises at least a part of C band, and said second frequency band comprises at least a part of L band.

4. A system according to claim 1, wherein said antenna comprises at least one reflector, and a feed element array coupled to said reflector.

5. A system according to claim 4, wherein said feed element array comprises an array of feed horns.

6. A system according to claim 1, wherein said fixed terrestrial terminal is located in the overlap region between third and fourth specific ones of said spot beams, where a first line joining the centers of said first and second specific ones of said spot beams is skewed relative to a second line joining the centers of said third and fourth specific ones of said spot beams.

7. A system according to claim 6, wherein the larger skew angle between said first and second lines is 90°.

8. A system according to claim 6, wherein said coupling means couples said beacon signals to said beamforming network in a manner which generates said third and fourth specific ones of said spot beams in a temporal sequence; and wherein said control means generates said control signals for tending to move said spot beams to a condition in which said beacon signals associated with said first and second specific spot beams have a common value of at least one of said characteristics, and in which said beacon signals associated with said third and fourth specific spot beams have a common value of at least one of said characteristics.

9. A system according to claim 8, wherein said common value of said one of said characteristics of said beacon signals associated with said first and second specific ones of said spot beams is at least approximately equal to said common value of said one of said characteristics of said beacon signals associated with said third and fourth specific ones of said spot beams.

10. A system according to claim 1, wherein said control means comprises means for adjusting the position of said antenna relative to said spacecraft body.

11. A system according to claim 1, wherein said control means comprises means for adjusting the attitude of said spacecraft body.

12. A spacecraft communication system, said system including:

transmit antenna means mounted on said spacecraft, for generating a plurality of transmit spot beams directed toward the Earth, each of which transmit spot beams defines a footprint which is in a first predetermined spatial relationship with others of said footprints of said transmit spot beams, each of said spot beams being for transmitting communications to at least user terminals located within that one of said footprints associated with said transmit spot beam:

receive antenna means mounted on said spacecraft, for generating a like plurality of receive spot beams directed toward the Earth, each of which receive spot beams defines a footprint, which is ideally in said first predetermined spatial relationship with others of said footprints of said receive spot beams, but which plurality of receive spot beams may not be congruent with said plurality of transmit spot beams of said transmitting antenna, each of said receive spot beams of said receive antenna being for receiving communications from at least user terminals located within said footprint associated with said receive spot beam:

control means coupled to said transmit antenna, for causing the footprints of at least some of said transmit spot beams to assume a second predetermined spatial condition relative to a location on the Earth, whereby the footprints of said plurality of transmit spot beams assume said first predetermined condition relative to each other and second predetermined spatial condition relative to said location on the Earth; and control means coupled to said receive antenna, for causing the footprints of at least some of said receive spot beams to assume said second predetermined spatial condition relative to said location on the Earth, in such a manner that said footprints of said plurality of receive spot beams assume said first predetermined spatial condition relative to each other and said second predetermined spatial condition relative to said location on the Earth, whereby said footprints of said spot beams of said transmit and receive antennas are congruous.

13. A communication system according to claim 12, wherein said location is fixed.

14. A communication system according to claim 12, wherein said control means coupled to said transmit antenna comprises:

beacon signal generating means;

commutating means coupled to said beacon signal generating means and to said transmit antenna, for causing said beacon signal to be transmitted on different beams of said transmit antenna at different times;

receiving means at said location, for receiving, at said different times, at least some of said beacon signals transmitted on said different beams, to form received beacon signals;

processing means coupled to said receiving means, for processing said received beacon signals, and for forming error signals therefrom indicative of deviation of said transmit antenna from a desired position; and antenna position control means coupled to said processing means and to said antenna, for causing said transmit antenna to move toward said desired position.

15. A communication system according to claim 12, wherein said control means coupled to said receive antenna comprises:

beacon signal generating means;

transmitting means at said location, said transmitting means being coupled to said beacon signal generating means, for forming transmitted beacon signals;

commutating means coupled to said receive antenna for receiving said beacon signal on different beams of said receive antenna at different times, for thereby generating received beacon signals;

processing means coupled to said commutating means, for processing said received beacon signals, and for forming error signals therefrom indicative of deviation of said receive antenna from a desired position; and antenna position control means coupled to said processing means and to said receive antenna, for causing said receive antenna to move toward said desired position.

* * * * *